(12) United States Patent
Kosaki et al.

(10) Patent No.: US 8,960,350 B2
(45) Date of Patent: Feb. 24, 2015

(54) VEHICLE AND ELECTRIC STORAGE APPARATUS

(75) Inventors: Akihiro Kosaki, Aichi-gun (JP); Shigeru Fukuda, Nagoya (JP); Shigeto Ozaki, Obu (JP); Takanori Kumagai, Toyota (JP); Yasutoshi Mizuno, Toyokawa (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/816,907

(22) PCT Filed: Aug. 31, 2010

(86) PCT No.: PCT/JP2010/005350
§ 371 (c)(1),
(2), (4) Date: Feb. 13, 2013

(87) PCT Pub. No.: WO2012/029089
PCT Pub. Date: Mar. 8, 2012

(65) Prior Publication Data
US 2013/0146373 A1  Jun. 13, 2013

(51) Int. Cl.
*B60R 16/04* (2006.01)
*B60K 1/04* (2006.01)
(Continued)

(52) U.S. Cl.
CPC .............. *B60K 1/04* (2013.01); *B60L 11/1874* (2013.01); *H01M 2/1083* (2013.01); *H01M 10/44* (2013.01); *H01M 2/1077* (2013.01); *H01M 10/425* (2013.01); *B60L 3/0046* (2013.01); *B60L 3/04* (2013.01); *B60L 7/14* (2013.01); *B60L 11/1803* (2013.01); *B60L 11/1864* (2013.01); *B60L 11/1877* (2013.01); *B60L 11/1879* (2013.01); *H01M 10/5093* (2013.01); *B60K 2001/0438* (2013.01); *H01M 2220/20* (2013.01); *Y02T 10/7005* (2013.01); *B60Y 2200/11* (2013.01); *B60L 2210/14* (2013.01); *B60L 2240/545* (2013.01); *Y02T 10/7225* (2013.01); *Y02T 10/7061* (2013.01); *Y10S 903/907* (2013.01)
USPC ...... 180/68.5; 180/68.1; 180/65.22; 903/907; 429/120

(58) Field of Classification Search
USPC ..................... 180/68.1, 68.5, 65.22; 903/907; 429/120
See application file for complete search history.

(56) References Cited

U.S. PATENT DOCUMENTS 1,964,564 A * 6/1934 Ellis Ray C .................. 180/68.5
5,490,572 A * 2/1996 Tajiri et al. ................... 180/65.1
(Continued)

FOREIGN PATENT DOCUMENTS

JP             05169981 A  *  7/1993  .............. B60K 1/04
JP      A-06-020716         1/1994
(Continued)

*Primary Examiner* — J. Allen Shriver, II
*Assistant Examiner* — Steve Clemmons
(74) *Attorney, Agent, or Firm* — Oliff PLC

(57) ABSTRACT

A vehicle includes a floor panel and an electric storage apparatus fixed to a lower face of the floor panel and outputting an energy for use in running of the vehicle. The electric storage apparatus includes a first electric storage stack including a plurality of electric storage elements, an electronic device used to control charge and discharge of the electric storage apparatus and located below the first electric storage stack in the vehicle, and a case accommodating the first electric storage stack and the electronic device and fixed to the lower face of the floor panel.

14 Claims, 16 Drawing Sheets

(51) Int. Cl.
  *B60L 11/18* (2006.01)
  *H01M 2/10* (2006.01)
  *H01M 10/44* (2006.01)
  *H01M 10/42* (2006.01)
  *B60L 3/00* (2006.01)
  *B60L 3/04* (2006.01)
  *B60L 7/14* (2006.01)
  *H01M 10/66* (2014.01)

(56) References Cited

U.S. PATENT DOCUMENTS

| | | | |
|---|---|---|---|
| 5,948,298 A | | 9/1999 | Ijaz |
| 6,040,080 A | * | 3/2000 | Minami et al. ............... 429/96 |
| 6,094,927 A | * | 8/2000 | Anazawa et al. ............ 62/239 |
| 7,353,900 B2 | * | 4/2008 | Abe et al. ................. 180/68.5 |
| 2003/0067747 A1 | * | 4/2003 | Hasegawa et al. ........... 361/695 |
| 2007/0015049 A1 | * | 1/2007 | Hamada et al. .............. 429/120 |
| 2007/0141454 A1 | * | 6/2007 | Marukawa et al. ........... 429/120 |
| 2007/0141459 A1 | * | 6/2007 | Goto et al. ................... 429/159 |
| 2007/0175623 A1 | * | 8/2007 | Park et al. ................... 165/202 |
| 2008/0257624 A1 | * | 10/2008 | Kubo ............................ 180/68.1 |
| 2009/0145676 A1 | | 6/2009 | Takasaki et al. |
| 2009/0183935 A1 | * | 7/2009 | Tsuchiya .................... 180/68.1 |
| 2009/0260905 A1 | * | 10/2009 | Shinmura ................... 180/68.1 |
| 2010/0059299 A1 | * | 3/2010 | Hoermandinger et al. 180/65.21 |
| 2010/0294580 A1 | * | 11/2010 | Kubota et al. ............... 180/68.1 |

FOREIGN PATENT DOCUMENTS

| | | | |
|---|---|---|---|
| JP | A-10-138956 | 5/1998 | |
| JP | 10149805 A | * 6/1998 | ............ H01M 2/10 |
| JP | 2004306726 A | * 11/2004 | ............ B60K 11/06 |
| JP | A-2007-179872 | 7/2007 | |
| JP | A-2008-080930 | 4/2008 | |
| JP | A-2009-083656 | 4/2009 | |
| JP | A-2009-87773 | 4/2009 | |
| JP | A-2009-137408 | 6/2009 | |
| JP | A-2010-015788 | 1/2010 | |

* cited by examiner

VEHICLE AND ELECTRIC STORAGE APPARATUS

TECHNICAL FIELD

The present invention relates to a vehicle on which an electric storage apparatus is mounted.

BACKGROUND ART

In a vehicle on which a battery is mounted, the output from the battery is used to run the vehicle. An electronic device (for example, a relay) for use in controlling charge and discharge of the battery is placed above the battery.

PRIOR ART DOCUMENTS

Patent Documents

[Patent Document 1] Japanese Patent Laid-Open No. 2009-087773
[Patent Document 2] Japanese Patent Laid-Open No. 2010-015788

SUMMARY OF THE INVENTION

Problems to be Solved by the Invention

It is necessary to place the battery and the electronic device efficiently depending on the position where the battery is mounted on the vehicle.

Means for Solving the Problems

According to a first aspect, the present invention provides a vehicle including a floor panel and an electric storage apparatus fixed to a lower face of the floor panel and outputting an energy for use in running of the vehicle. The electric storage apparatus includes a first electric storage stack including a plurality of electric storage elements, an electronic device used to control charge and discharge of the electric storage apparatus and located below the first electric storage stack in the vehicle, and a case accommodating the first electric storage stack and the electronic device and fixed to the lower face of the floor panel.

According to a second aspect, the present invention provides an electric storage apparatus mounted on a vehicle and outputting an energy for use in running of the vehicle, including a first electric storage stack including a plurality of electric storage elements, an electronic device used to control charge and discharge of the electric storage apparatus and located below the first electric storage stack in the vehicle, and a case accommodating the first electric storage stack and the electronic device and fixed to a lower face of a floor panel of the vehicle.

A duct can be connected to the first electric storage stack to supply a cooling medium to the first electric storage stack to suppress a rise in temperature of the first electric storage stack. For example, air present outside the vehicle can be used as the cooling medium. The electronic device can be located below a portion connecting the first electric storage stack to the duct in the vehicle. For example, a relay switching conduction and non-conduction between the electric storage apparatus and a load can be used as the electronic device.

Heat produced in the electronic device moves upward and reaches the first electric storage stack. Thus, the portion of the first electric storage stack that is connected to the duct receives the heat from the electronic device, and the cooling medium from the duct first reaches that portion. This can prevent a rise in temperature of the first electric storage stack due to the heat from the electronic device.

A tunnel recessed upward in the vehicle can be formed in the floor panel. At least part of the first electric storage stack can be located inside the tunnel. This allows the mounting of the electric storage apparatus on the floor panel having the tunnel while the formation of dead space is suppressed.

When the tunnel extends in a forward-rearward direction of the vehicle, the plurality of electric storage elements of the first electric storage stack can be placed side by side in a longitudinal direction of the tunnel. This can facilitate the placement of the first electric storage stack along the tunnel. When the tunnel is located between a driver's seat and a passenger's seat, the comfort of the interior of the vehicle is not adversely affected.

A second electric storage stack can be provided in addition to the first electric storage stack. The use of the second electric storage stack can improve the output performance of the electric storage apparatus. The second electric storage stack can be placed along the first electric storage stack and next to the electronic device. This can place the electric storage apparatus along the floor panel.

A plurality of electric storage elements included in the second electric storage stack can be placed side by side in a left-right direction of the vehicle. When a plurality of such second electric storage stacks are used, the plurality of second electric storage stacks can be placed side by side in the forward-rearward direction of the vehicle. A duct can be connected to the second electric storage stack to supply a cooling medium.

Advantage of the Invention

According to the present invention, in the structure having the electric storage apparatus fixed to the lower face of the floor panel, the electronic device is placed below the first electric storage stack in the vehicle, so that the electric storage apparatus can be placed efficiently on the floor panel. The first electric storage stack including the plurality of electric storage elements tends to be larger than the electronic device, and if the electronic device is placed above the first electric storage stack, dead space is easily produced between the first electric storage stack and the floor panel. According to the present invention, the electric storage apparatus can be fixed to the floor panel without producing such dead space.

EMBODIMENT OF THE INVENTION

An embodiment of the present invention will hereinafter be described.

[Embodiment 1]

Figure 1:
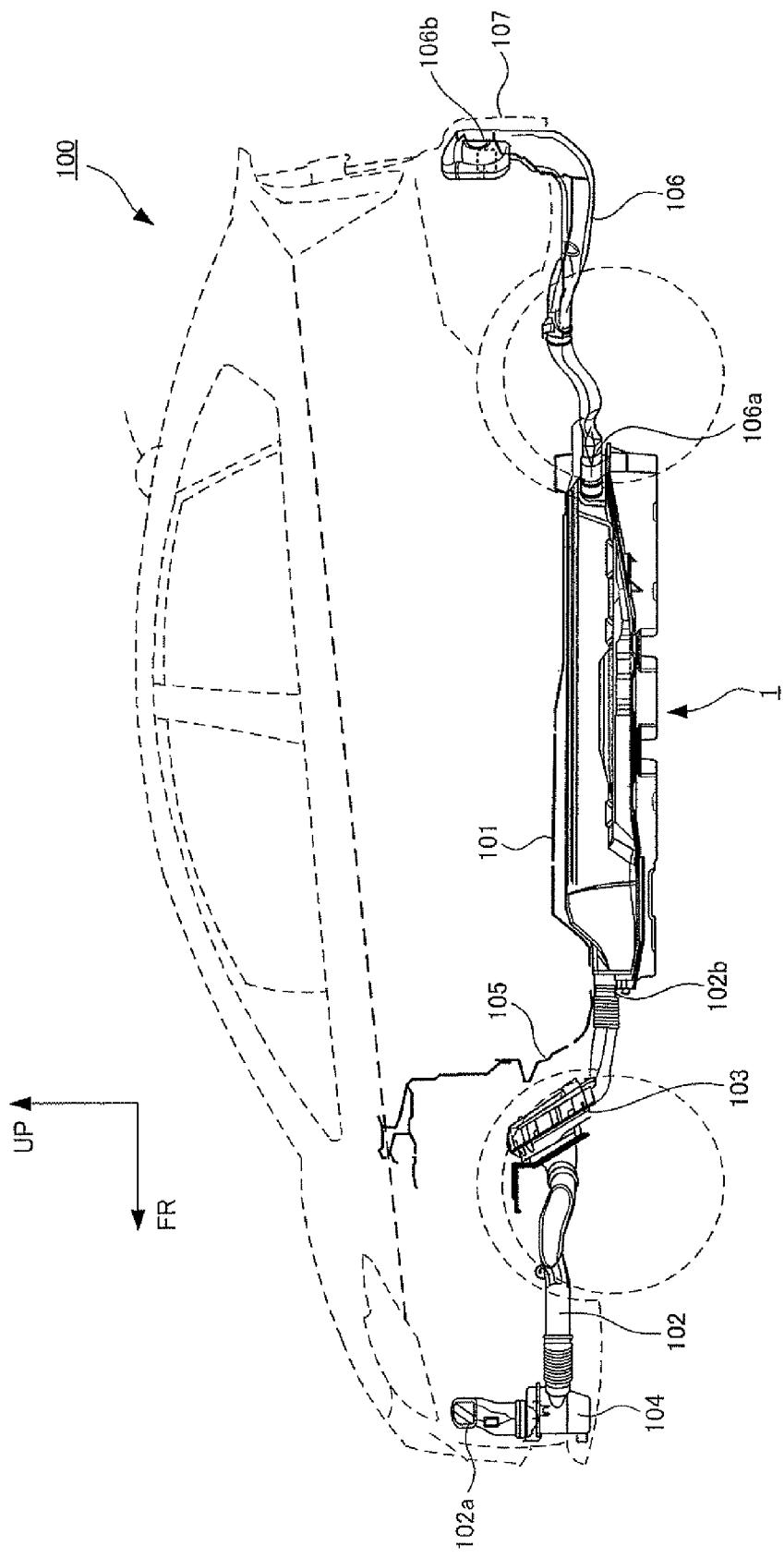
FIG. 1 is a side view of a vehicle having a battery pack.

A battery pack (corresponding to an electric storage apparatus) which is Embodiment 1 of the present invention will hereinafter be described. First, a vehicle having the battery pack of the present embodiment is described with reference to FIG. 1. FIG. 1 is a side view of the vehicle and mainly shows the battery pack and a mechanism for adjusting the temperature of the battery pack. An arrow UP shown in FIG. 1 indicates an upward direction of the vehicle and an arrow FR indicates a forward direction of the vehicle.

A vehicle 100 according to the present embodiment has a floor panel 101, and the battery pack 1 is attached to a lower face of the floor panel 101. Since an upper face of the floor panel 101 forms part of the vehicle interior, the battery pack 1 is placed outside the vehicle interior. The vehicle interior refers to space where passengers ride. The floor panel 101 is part of a body of the vehicle 100.

Examples of the vehicle 100 having the battery pack 1 mounted thereon include a hybrid vehicle and an electric vehicle. The hybrid vehicle includes not only the battery pack 1 but also an internal-combustion engine or a fuel cell as the power source for running the vehicle 100. The electric vehicle includes only the battery pack 1 as the power source for the vehicle 100.

The battery pack 1 is connected to a motor generator (not shown) which receives the output from the battery pack 1 to generate a kinetic energy for running the vehicle 100. The rotational power of the motor generator is transferred to wheels via a power transmission mechanism.

A step-up circuit and/or an inverter can be placed between the battery pack 1 and the motor generator. When the step-up circuit is placed, the output voltage of the battery pack 1 can be increased. When the inverter is used, the DC power output from the battery pack 1 can be converted into an AC power, and a three-phase AC motor can be used as the motor generator. The motor generator converts a kinetic energy produced in braking of the vehicle 100 into an electric energy and outputs the electric energy to the battery pack 1. The battery pack 1 stores the electric power from the motor generator.

An air inlet duct 102 is connected to the battery pack 1 and is placed in front of the battery pack 1 in the vehicle 100. An air inlet port 102a is provided at one end of the air inlet duct 102, and air is taken in through the air inlet port 102a. The other end 102b of the air inlet duct 102 is connected to the battery pack 1.

A blower 103 is provided for the air inlet duct 102 and is driven to move the air from the air inlet port 102a of the air inlet duct 102 toward the battery pack 1. While the blower 103 is provided for the air inlet duct 102 in the present embodiment, the present invention is not limited thereto. It is only required that the air should flow from the air inlet port 102a of the air inlet duct 102 toward the battery pack 1, and for example, the blower 103 may be provided for an air outlet duct 106, later described.

An air cleaner 104 is provided for the air inlet duct 102 and purifies the air taken in through the air inlet port 102a of the air inlet duct 102. Specifically, the air cleaner 104 uses a filter to remove foreign matters contained in the air. The blower 103 and the air cleaner 104 are placed in the space provided in front of a dashboard 105 in the vehicle 100. When the vehicle 100 is a vehicle including an engine, that space corresponds to an engine room.

The air directed from the air inlet duct 102 toward the battery pack 1 passes through the battery pack 1 and then enters into the air outlet duct 106. The passage of the air through the battery pack 1 can adjust the temperature of the battery pack 1. For example, the air can take the heat from the battery pack 1 to cool the battery pack 1. The flow of the air within the battery pack 1 is described later.

One end 106a of the air outlet port 106 is connected to the battery pack 1. An air outlet port 106b is formed at the other end of the air outlet duct 106. The other end of the air outlet duct 106 is placed inside a rear bumper case 107. The air discharged through the air outlet port 106b moves to the space formed inside the rear bumper case 107.

Figure 2:
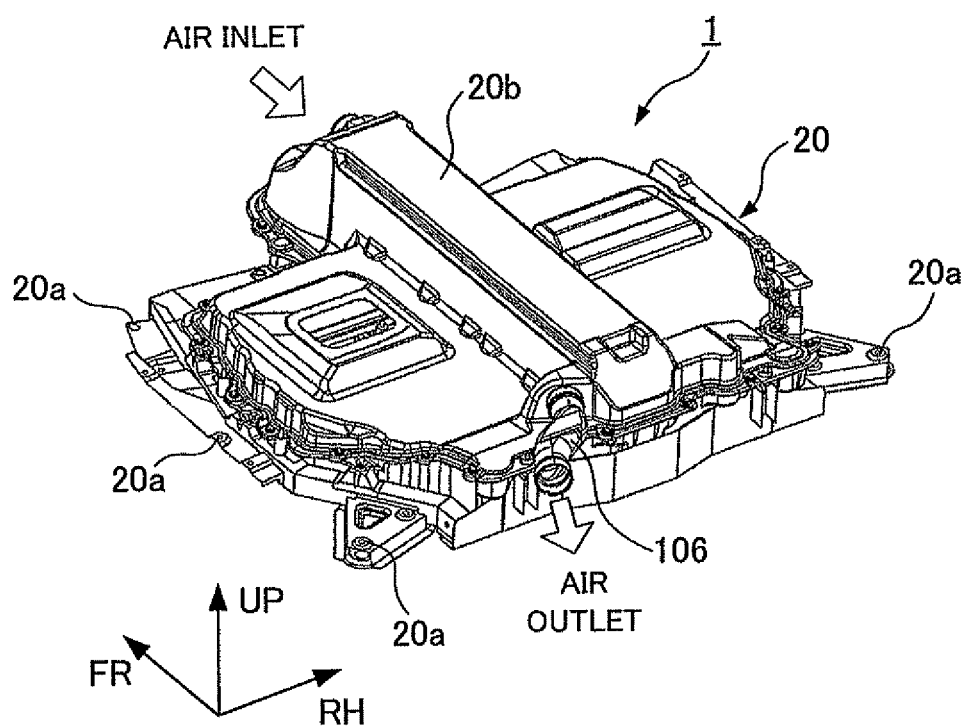
FIG. 2 is an external view of the battery pack.
Figure 3:
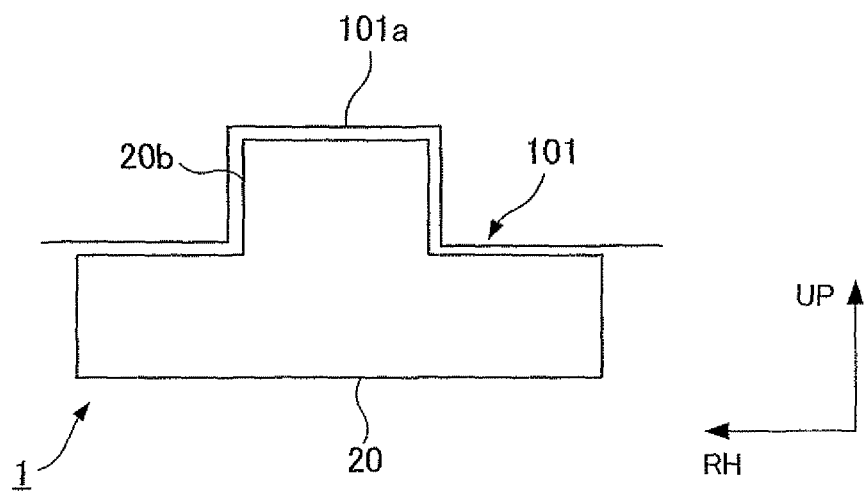
FIG. 3 is a schematic diagram of the battery pack and a floor panel viewed from the front of the vehicle.
Figure 4:
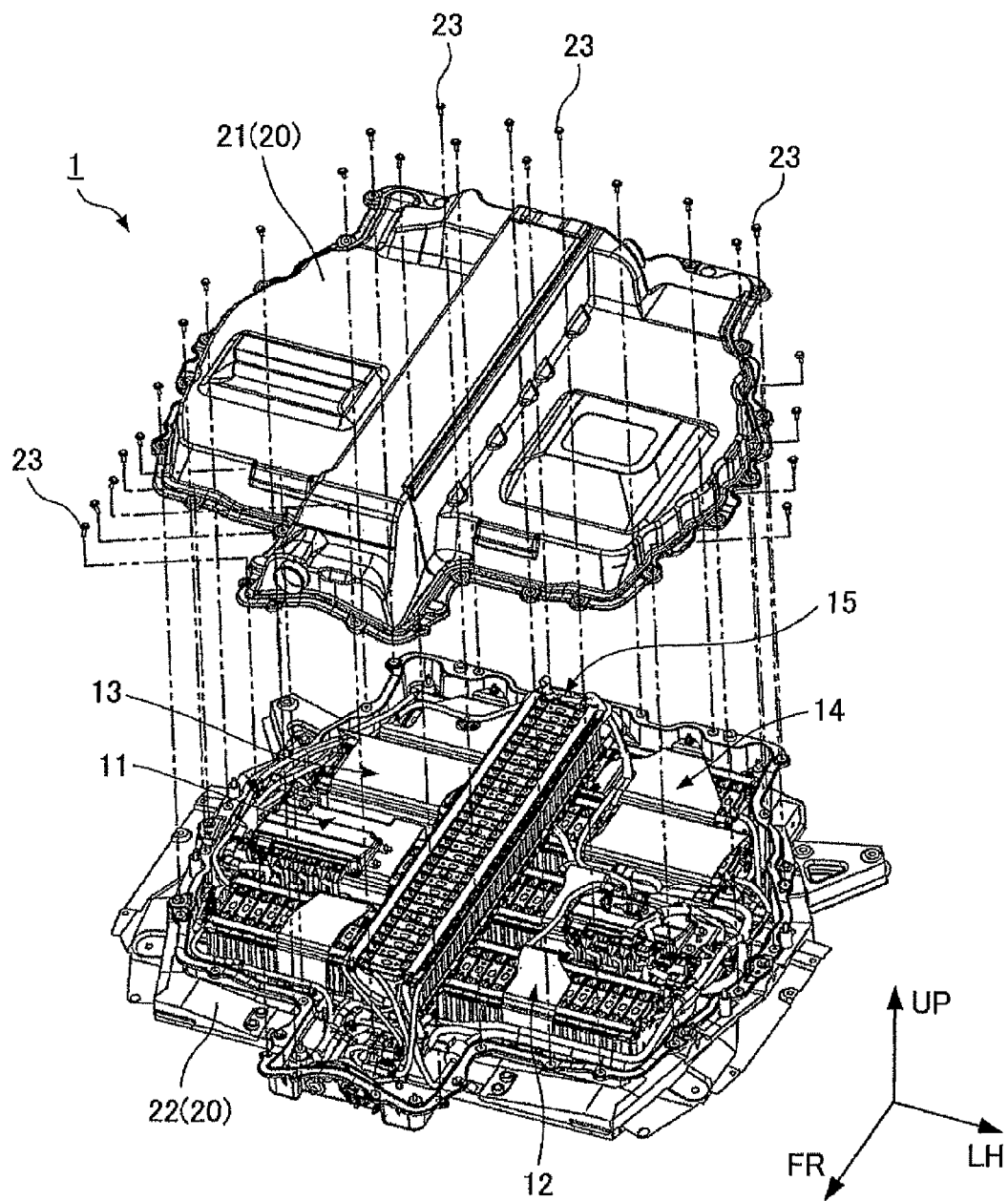
FIG. 4 is an exploded view of the battery pack.

Next, the configuration of the battery pack 1 is described. FIG. 2 is an external view of the battery pack 1. FIG. 3 is a schematic diagram of the battery pack 1 and the floor panel 101 when viewed from the front of the vehicle 100. FIG. 4 is an exploded view of the battery pack 1. An arrow RH shown in FIG. 2 indicates the right direction relative to the forward direction FR of the vehicle 100, and an arrow LH shown in FIG. 4 indicates the left direction relative to the forward direction FR of the vehicle 100.

The battery pack 1 has five battery stacks (corresponding to electric storage stacks) 11 to 15, and a pack case 20 accommodating the battery stacks 11 to 15. A plurality of fastening portions 20a are provided at the outer edge of the pack case 20 and are used to fix the battery pack 1 to the floor panel 101.

A protruding portion 20b is formed on an upper face of the pack case 20. The protruding portion 20b protrudes upward and extends in a forward-rearward direction of the vehicle 100. As shown in FIG. 3, the upper face of the pack case 20 is placed along the floor panel 101. The floor panel 101 has a center tunnel 101a. The center tunnel 101a protrudes upward and extends in the forward-rearward direction of the vehicle 100. The center tunnel 101a is provided between a driver's seat and a passenger's seat in a left-right direction of the vehicle 100. The protruding portion 20b of the pack case 20 is located inside the center tunnel 101a.

As shown in FIG. 4, the battery pack 1 has the five battery stacks 11 to 15 which are covered with an upper case 21 and a lower case 22. The upper case 21 is fixed to the lower case 22 by a plurality of bolts 23. The upper case 21 can be formed of resin containing glass fiber, for example.

Each of the battery stacks 11 to 14 extends in the left-right direction of the vehicle 100, and the four battery stacks 11 to 14 are arranged in the forward-rearward direction of the vehicle 100. The battery stack (corresponding to a first electric storage stack) 15 is placed above the four battery stacks 11 to 14 (corresponding to second electric storage stacks), and the battery stack 15 extends in the forward-rearward direction of the vehicle 100. The battery stack 15 is placed at the position coinciding with the protruding portion 20b of the pack case 20. In other words, the battery stack 15 is located inside the center tunnel 101a.

Figure 5:
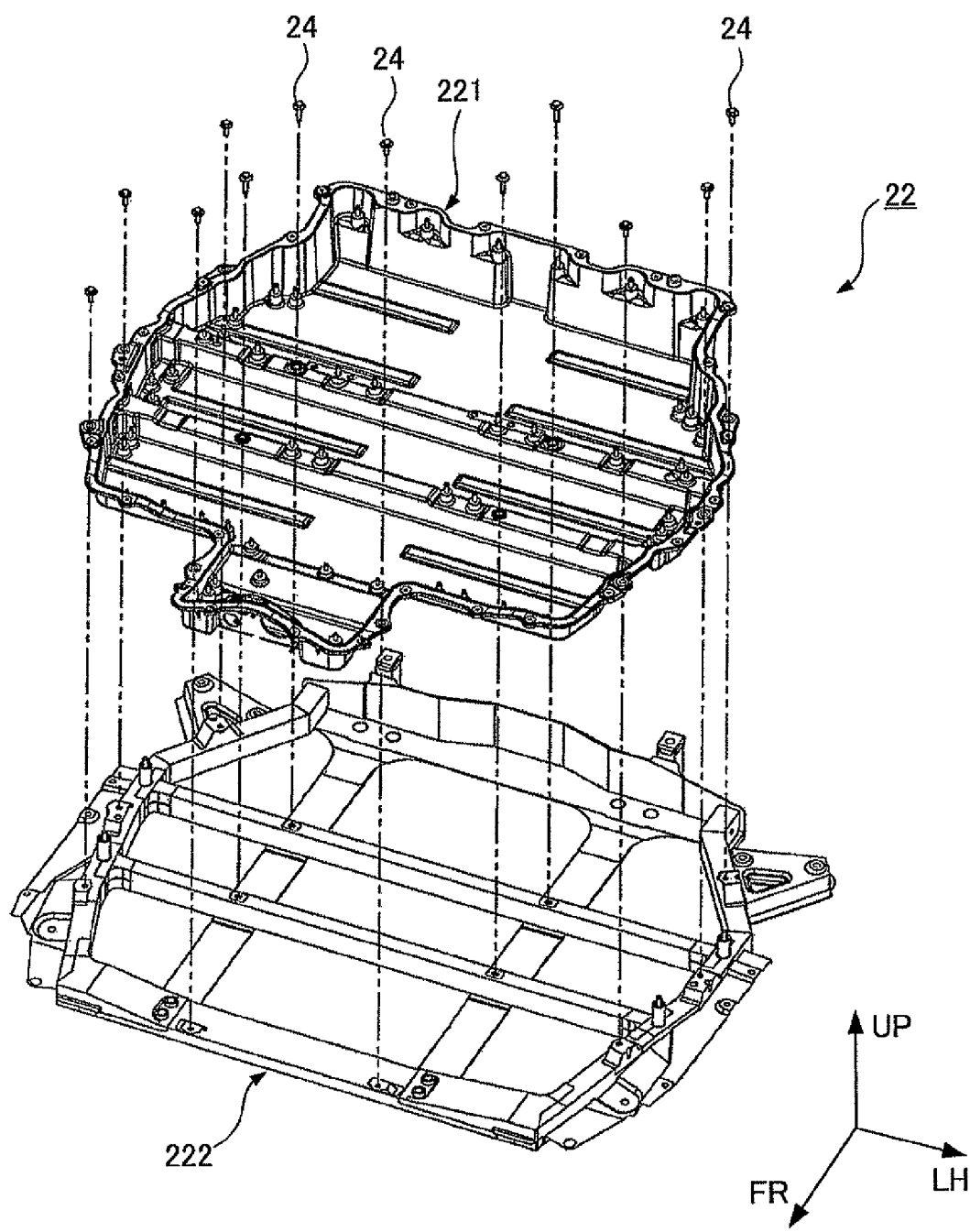
FIG. 5 is an exploded view of a lower case.

As shown in FIG. 5, the lower case 22 has a lower carrier 221 and a frame 222. The battery stacks 11 to 15 are fixed to the lower carrier 221. The lower carrier 221 is fixed to the frame 222 by a plurality of bolts 24. The lower carrier 221 can be formed of resin containing glass fiber, for example. The frame 222 can be formed of metal such as iron. The frame 222 is used to ensure the strength of the lower case 22. The frame 222 is fixed to the floor panel 101.

Figure 6:
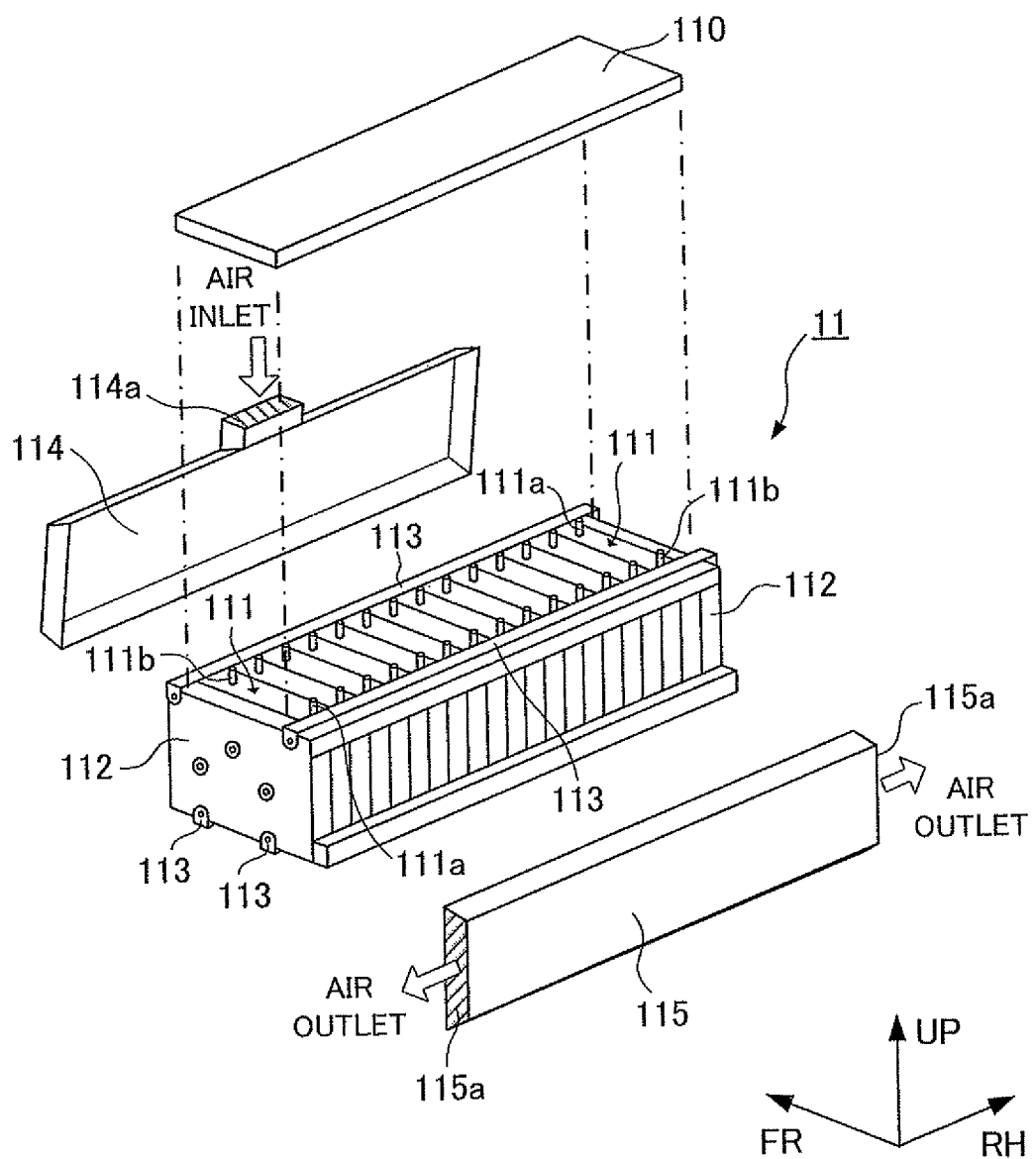
FIG. 6 is an exploded view of a battery stack.

Next, the configuration of each of the battery stacks 11 to 15 is described. FIG. 6 is an exploded view of the battery stack 11. The battery stack 11 has a plurality of cells (corresponding to electric storage elements) 111 placed side by side in one direction. In the present embodiment the battery stacks 11 to 15 include different number of cells. The numbers of the cells constituting the battery stacks 11 to 15 can be set as appropriate. In the present embodiment, the numbers of the cells constituting the battery stacks 11 to 15 are set on the basis of the shape of the lower case 22.

A secondary battery such as a nickel metal hydride battery or a lithium-ion battery can be used as the cell 111. An electric double layer capacitor may be used instead of the secondary battery. While the plurality of cells are placed side by side in one direction in each of the battery stacks 11 to 15 in the present embodiment, the present invention is not limited thereto. Specifically, a plurality of cells may be used to constitute a single battery module, and a plurality of such battery modules may be placed side by side in one direction.

A power-generating element is housed in the cell 111. The power-generating element is an element capable of charge and discharge. The power-generating element can be formed of a positive electrode component, a negative electrode component, and a separator (containing an electrolytic solution) placed between the positive electrode component and the negative electrode component. The positive electrode component is provided by faulting a positive electrode active material layer on the surface of a collector plate. The negative electrode component is provided by forming a negative electrode active material layer on the surface of a collector plate.

A positive electrode terminal 111a and a negative electrode terminal 111b are provided on an upper face of the cell 111. The positive electrode terminal 111a is electrically connected to the positive electrode component of the power-generating element. The negative electrode terminal 111b is electrically connected to the negative electrode component of the power-generating element. Adjacent two of the cells 111 are electrically connected to each other via a bus bar.

In the present embodiment, a bus bar module 110 having a plurality of bus bars formed integrally is used. The bus bar module 110 is placed on an upper face of the battery stack 11. The bus bar module 110 has the plurality of bus bars and a holder holding each of the bus bars. The holder is formed of an insulating material (for example, resin). Each of the bus bars can be coated with an insulating cover (for example, a cover made of resin), and the cover can be attached to the holder.

A pair of end plates 112 are placed at both ends of the battery stack 11. Each of restraint bands 113 extends in the direction in which the plurality of cells 111 are aligned, and the restraint band 113 is fixed at both ends to the pair of end plates 112. Two of the restraint bands 113 are placed on the upper face of the battery stack 11, and the other two restraint bands 113 are placed on a lower face of the battery stack 11.

The fixing of the restraint band 113 to the end plates 112 displaces the pair of end plates 112 in the direction in which they are brought closer to each other. This can provide a restraint force for the plurality of cells 111 sandwiched between the pair of end plates 112. A spacer is placed between adjacent two of the cells 111 to allow the entry of air between the adjacent two of the cells 111.

An air inlet chamber 114 and an air outlet chamber 115 are placed on both side faces of the battery stack 11. Specifically, the air inlet chamber 114 and the air outlet chamber 115 are placed at the positions between which the plurality of cells 111 are sandwiched in the direction orthogonal to the direction of the alignment of the plurality of cells 111. The air inlet chamber 114 has a connecting port 114a through which the air from the air inlet duct 102 enters. The air moves into the air inlet chamber 114 and then enters into the space formed between the adjacent two of the cells 111. Thus, the air moves from the air inlet chamber 114 toward the air outlet chamber 115.

Heat exchange performed between the air and the cells 111 can adjust the temperature of the cells 111. When the cells 111 generates heat due to charge and discharge, the air can take the heat from the cells 111 to suppress a rise in temperature of the cells 111. After the passage through the adjacent two of the cells 111, the air moves to the air outlet chamber 115. An air outlet port 115a is provided at each end of the air outlet chamber 115, and the air after the heat exchange is discharged through the air outlet port 115a. The air discharged through the air outlet port 115a moves into the space formed between the upper case 21 and the lower case 22.

The battery stacks 12 to 15 have configurations basically similar to the configuration of the battery stack 11 except that the battery stacks 11 to 15 include different numbers of cells. The plurality of cells constituting each of the battery stacks 11 to 14 are placed side by side in the left-right direction of the vehicle 100, and the plurality of cells constituting the battery stack 15 are placed side by side in the forward-rearward direction of the vehicle 100.

Figure 7:
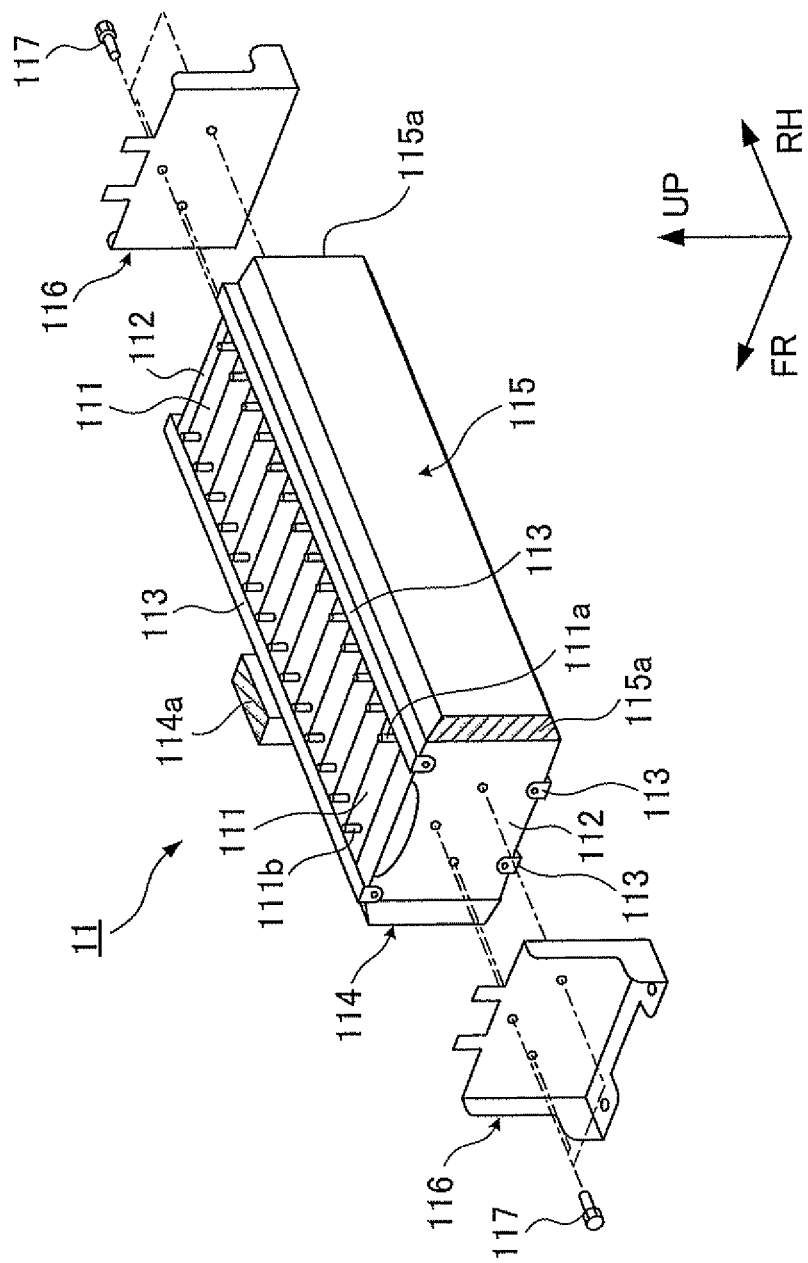
FIG. 7 is an external view showing a fixing structure of the battery stack.
Figure 8:
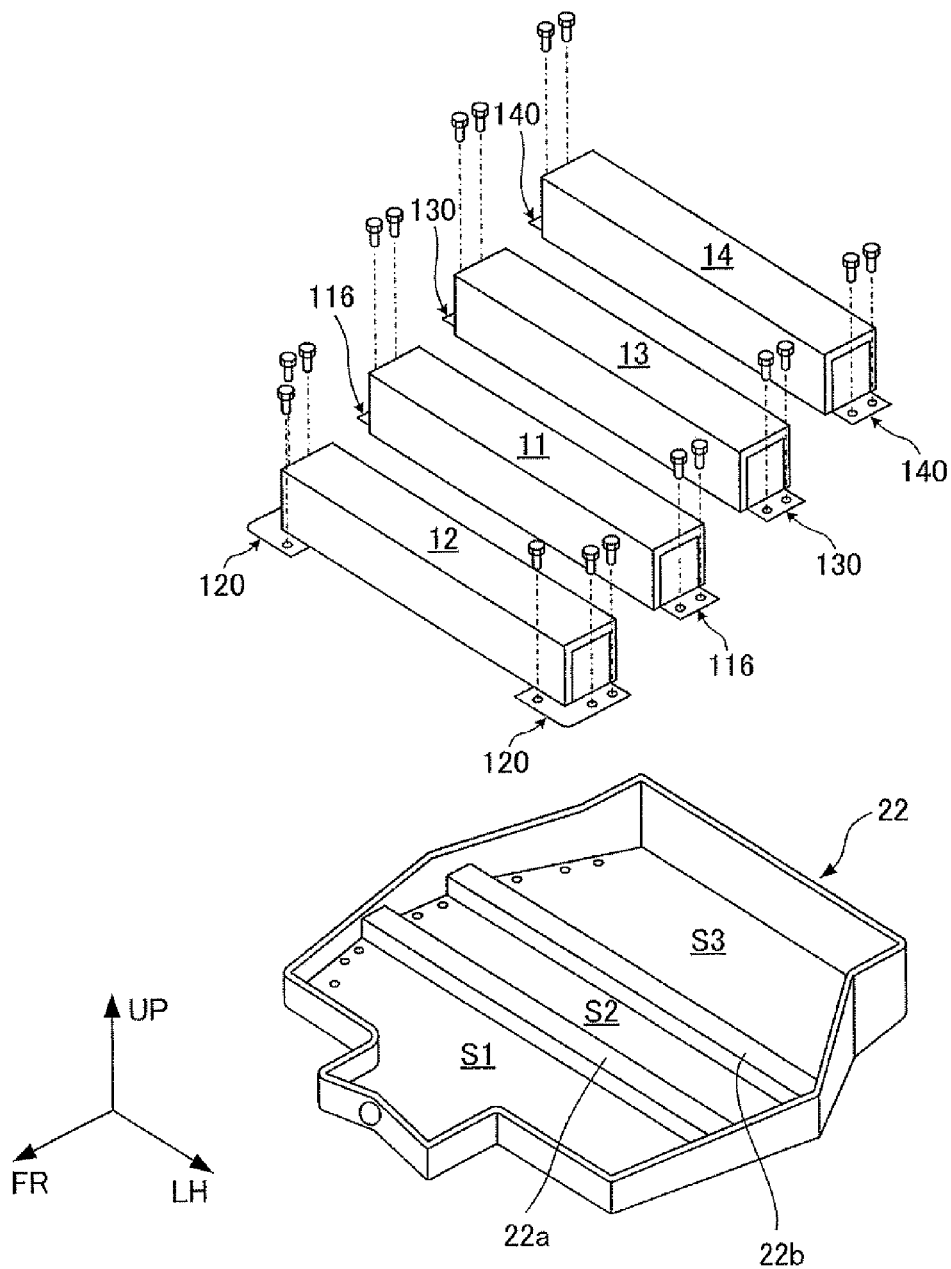
FIG. 8 is an external view for explaining the internal structure of the battery pack.

As shown in FIG. 7, a bracket 116 is fixed to each of the end plates 112 of the battery stack 11 by a bolt 117. As shown In FIG. 8, the bracket 116 is fixed to the lower case 22 by a bolt 118. This fixes the battery stack 11 to the lower case 22.

A bracket 120 is used to fix the battery stack 12 to the lower case 22. Specifically, the bracket 120 is fixed to a pair of end plates of the battery stack 12 and is fixed to the lower case 22. A bracket 130 is used to fix the battery stack 13 to the lower case 22. Specifically, the bracket 130 is fixed to a pair of end plates of the battery stack 13 and is fixed to the lower case 22. A bracket 140 is used to fix the battery stack 14 to the lower case 22. Specifically, the bracket 140 is fixed to a pair of end plates of the battery stack 14 and is fixed to the lower case 22.

The lower case 22 has two ribs 22a and 22b. The ribs 22a and 22b protrude upward and extend in the left-right direction of the vehicle 100. The ribs 22a and 22b are formed of part of the frame 222 (see FIG. 5). The battery stack 12 is mounted in a first region S1 located in front of the rib 22a in the vehicle 100. The battery stack 11 is mounted in a second region S2 located between the ribs 22a and 22b. The battery stacks 13 and 14 are mounted in a third region S3 located in back of the rib 22b in the vehicle 100.

Figure 9:
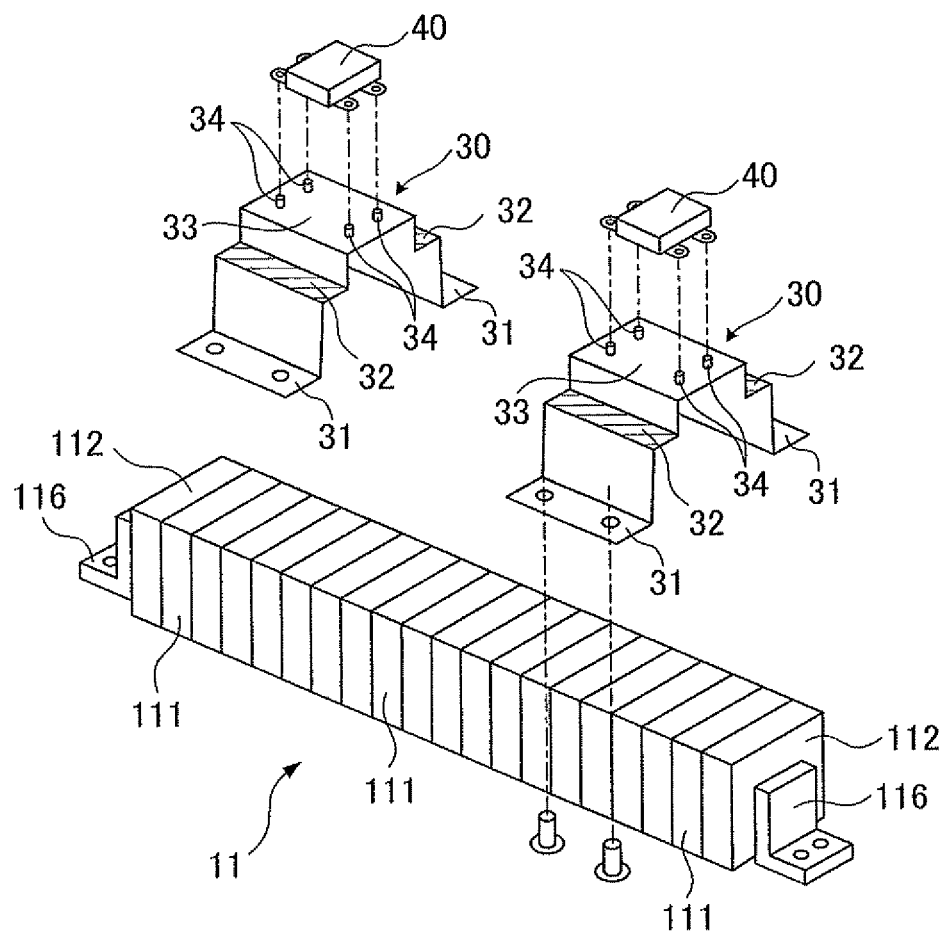
FIG. 9 is an external view of a holding structure of the battery stack.

As shown in FIG. 9, two brackets 30 hold the battery stack 11 tightly onto the lower case 22. A fixing portion 31 of the bracket 30 is fixed to the lower case 22 by bolts. A holding portion 32 of the bracket 30 holds the battery stack 11 tightly from above. An upper-face portion 33 of the bracket 30 is not in contact with the upper face of the battery stack 11 and has four pins 34. The pins 34 are used to fix a battery monitor unit 40 to the upper-face portion 33. As described later, the battery monitor unit 40 monitors the states of two assembled batteries formed of the battery stacks 11 to 15.

Each of the battery stacks 12 to 14 is held by a bracket tightly onto the lower case 22. The bracket tightly holding each of the battery stacks 12 to 14 has the structure similar to that of the bracket 30 shown in FIG. 9. The brackets tightly holding the battery stacks 12 to 14 are provided with no pins 34 as in the bracket 30 and has no battery monitor unit 40 attached thereto.

Figure 10:
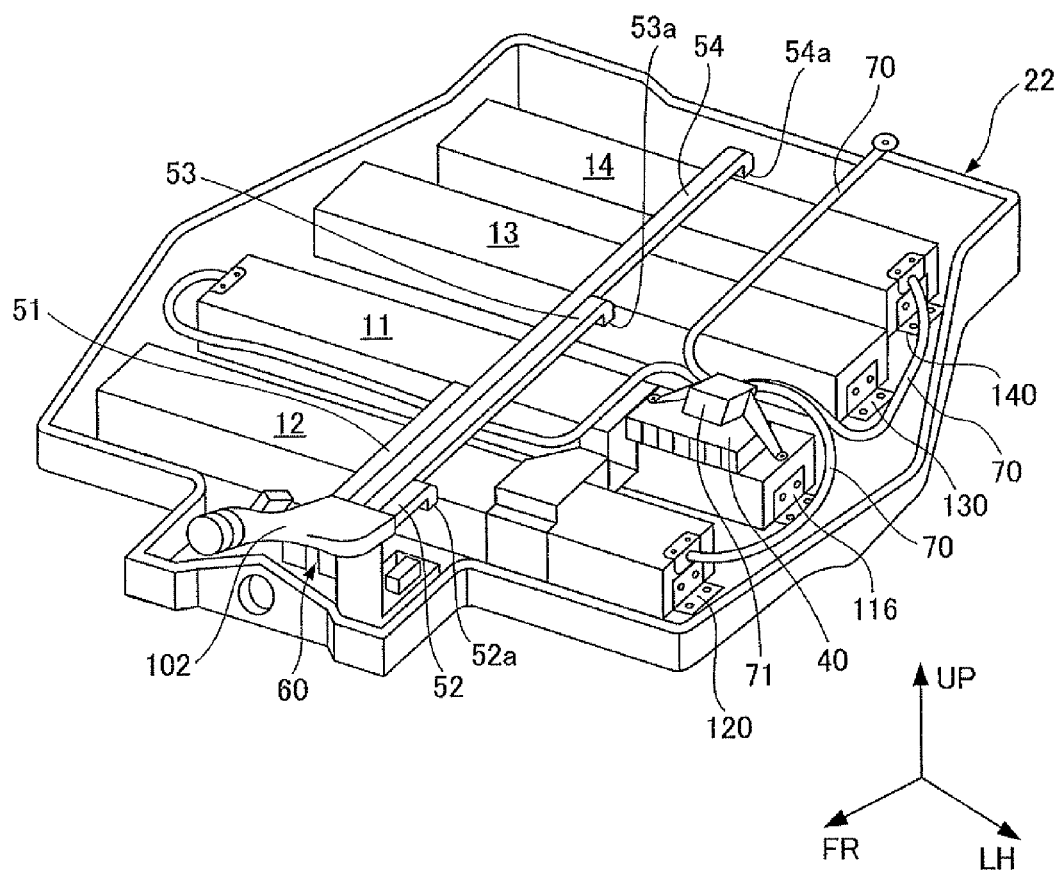
FIG. 10 is an external view for explaining the internal structure of the battery pack.
Figure 11:
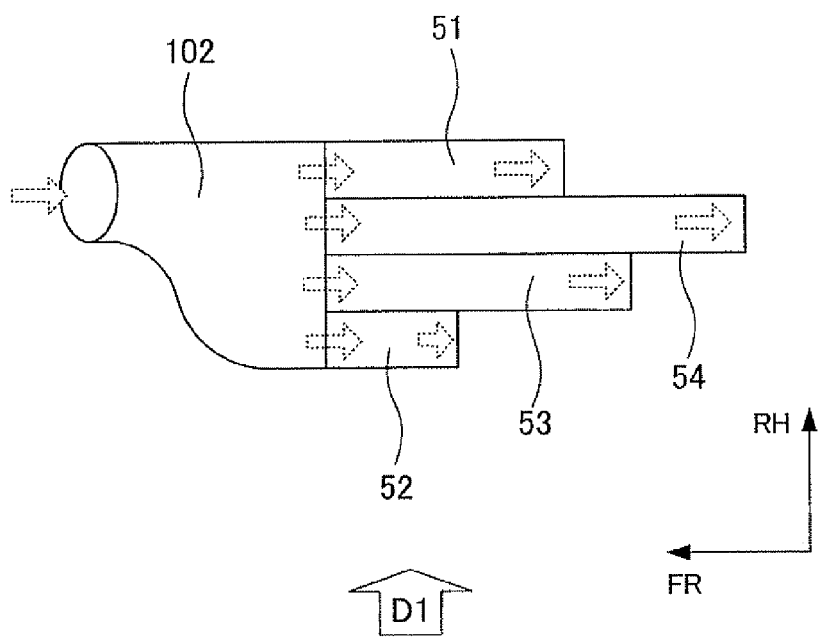
FIG. 11 is a top view of an air inlet duct and branch ducts.
Figure 12:
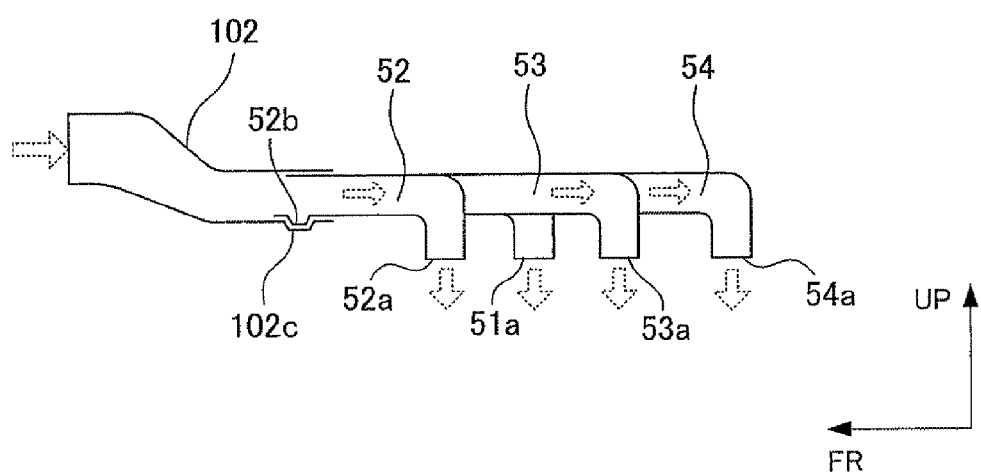
FIG. 12 is a side view of the air inlet duct and the branch ducts.

As shown in FIG. 10 and FIG. 11, four branch ducts 51 to 54 are connected to the air inlet duct 102. FIG. 10 is a diagram showing the layout of the branch ducts 51 to 54, and FIG. 11 is a top view of the branch ducts 51 to 54. As shown in FIG. 12, the branch duct 52 has a hook portion 52b, and the air inlet duct 102 has a recess portion 102c engaging with the hook portion 52b. The engagement of the hook portion 52b and the recess portion 102c can fix the branch duct 52 to the air inlet duct 102. FIG. 12 is a diagram of the branch ducts viewed from the direction indicated by an arrow D1 in FIG. 11.

Each of the branch ducts 51, 53, and 54 has a hook portion corresponding to the hook portion 52b of the branch duct 52 and engaging with the recess portion 102c of the air inlet duct 102. This can connect the branch ducts 51, 53, and 54 to the air inlet duct 102. The air from the air inlet duct 102 moves to the four branch ducts 51 to 54. Arrows indicated by dotted lines in FIG. 11 and FIG. 12 indicate the moving directions of the air.

A connecting port 51a of the branch duct 51 is connected to the connecting port 114a of the air inlet chamber 114 provided for the battery stack 11. The branch duct 51 is connected to a side face of the battery stack 11 that is located toward the front of the vehicle 100. The air in the branch duct 51 is supplied to the cells 111 of the battery stack 11. A connecting port 52a of the branch duct 52 is connected to the air inlet chamber of the battery stack 12, and the air in the branch duct 52 is supplied to the cells of the battery stack 12. The branch duct 52 is connected to a side face of the battery stack 12 that is located toward the front of the vehicle 100.

A connecting port 53a of the branch duct 53 is connected to the air inlet chamber provided for the battery stack 13, and the air in the branch duct 53 is supplied to the cells of the battery stack 13. The branch duct 53 is connected to a side face of the battery stack 13 that is located toward the front of the vehicle 100. A connecting port 54a of the branch duct 54 is connected to the air inlet chamber of the battery stack 14, and the air in the branch duct 54 is supplied to the cells of the battery stack 14. The branch duct 54 is connected to a side face of the battery stack 14 that is located toward the back of the vehicle 100.

As shown in FIG. 10, an electronic device 60 is placed below the air inlet duct 102. The electronic device 60 is fixed to the lower case 22. The electronic device 60 is a device used to control charge and discharge of the battery stacks 11 to 15. An example of the electronic device 60 is a system main relay. The system main relay allows or inhibits charge and discharge of each of the battery stacks 11 to 15.

Figure 13:
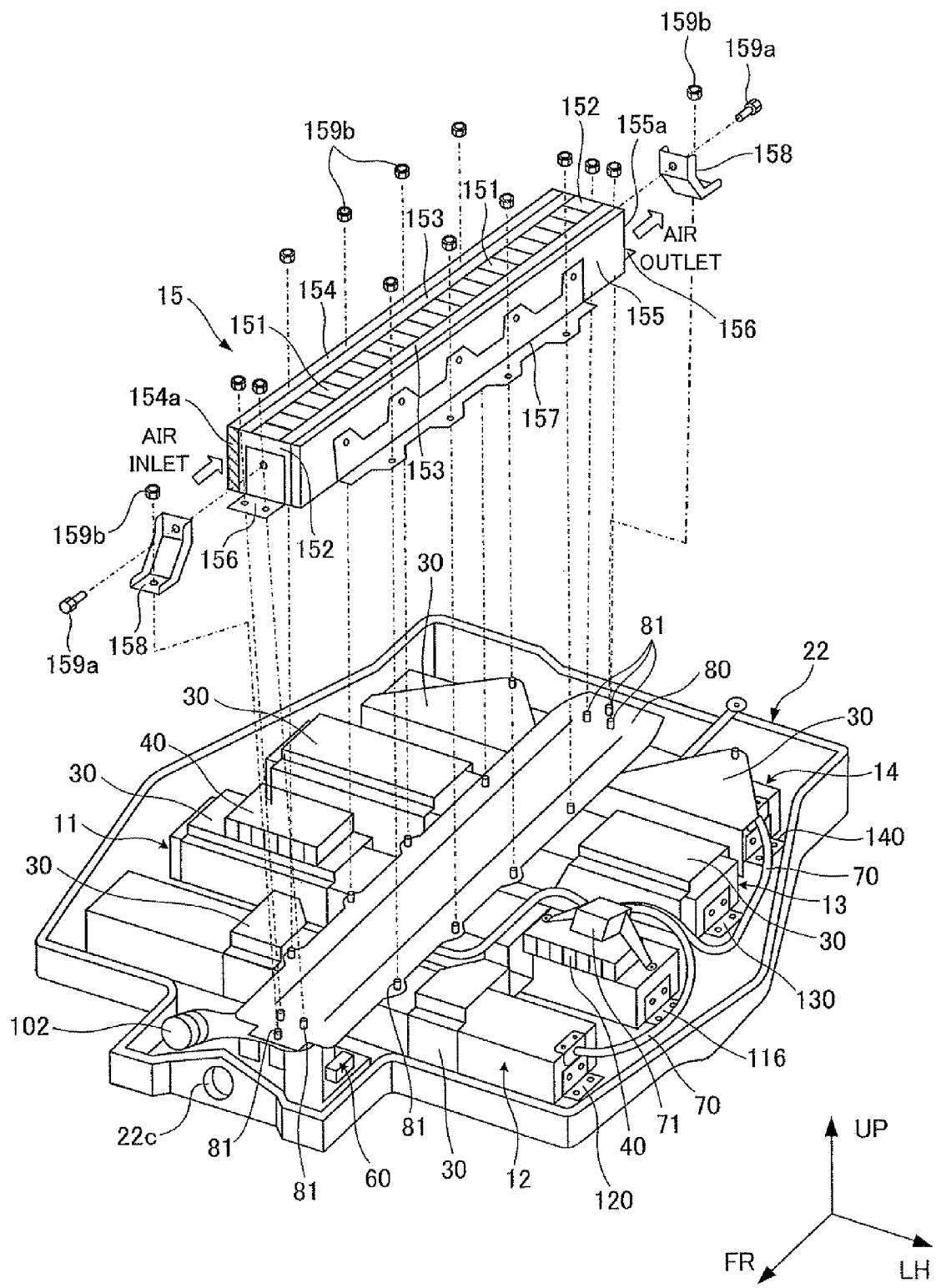
FIG. 13 is an external view for explaining the internal structure of the battery pack.

As shown in FIG. 13, a mount 80 is placed on upper faces of the branch ducts 51 to 54. The mount 80 is also located on an upper face of part of the air inlet duct 102. The mount 80 covers the branch ducts 51 to 54 when viewed from above. The mount 80 has a leg (not shown) extending downward, and the tip of the leg is fixed to the lower case 22. This can position the mount 80 on the upper faces of the branch ducts 51 to 54. While the leg is used to fix the mount 80 in the present embodiment, the present invention is not limited thereto. For example, a bracket may be placed between adjacent two of the battery stacks (11 to 14), and the mount is fixed to the bracket.

A plurality of pins 81 are provided on an upper face of the mount 80, and each of the pins 81 has a thread formed thereon. The battery stack 15 is placed on the upper face of the mount 80. The battery stack 15 has a plurality of cells 151, and the plurality of cells 151 are placed side by side in one direction (in the forward-rearward direction of the vehicle 100).

A pair of end plates 152 are placed at both ends of the battery stack 15. Each of restraint bands 153 extends in the forward-rearward direction of the vehicle 100, and the restraint band 153 is fixed at both ends to the pair of end plates 152. Two of the restraint bands 153 are placed on an upper face of the battery stack 15, and the other two restraint bands 153 are placed on a lower face of the battery stack 15. The use of the restraint bands 153 and the end plates 152 can provide a restraint force for the plurality of cells 151.

Two brackets 156 and 158 are fixed to each of the end plates 152 by a bolt 159a. The pin 81 of the mount 80 passes through the brackets 156 and 158 and mates with a nut 159b.

An air inlet chamber 154 and an air outlet chamber 155 are placed on both side faces of the battery stack 15. The air inlet chamber 154 extends in the direction in which the plurality of cells 151 are aligned, and a connecting port 154a is provided at one end of the air inlet chamber 154. The other end of the air inlet chamber 154 is closed. The air outlet chamber 155 extends in the direction in which the plurality of cells 151 are aligned, and an air outlet port 155a is provided at one end of the air outlet chamber 155. The other end of the air outlet chamber 155 is closed. The connecting port 154a is provided at one end of the battery stack 15 in the forward-rearward direction of the vehicle 100, and the air outlet port 155a is provided at the other end of the battery stack 15 in the forward-rearward direction of the vehicle 100. The connecting port 154a is connected to the air inlet duct 102, and the air from the air inlet duct 102 enters into the air inlet chamber 154.

A bracket 157 extends in the direction of the alignment of the plurality of cells 151 and is fixed to a surface of the battery stack 15 toward the LH direction. The pin 81 of the mount 80 passes through the bracket 157 and mates with a nut 159b. Although not shown in FIG. 13, another bracket 157 is fixed to a surface of the battery stack 15 toward the RH direction. The three brackets 156 to 158 are used to fix the battery stack 15 to the mount 80. As described in FIG. 6, the bus bar module is placed on the upper face of the battery stack 15.

Each of the battery stacks 12 to 14 is held tightly onto the lower case 22 by the bracket 30. The brackets 30 have shapes varying among the battery stacks 12 to 14. The five battery stacks 11 to 15 are connected electrically via a wire harness 70. An opening portion 22c is formed in a side wall of the lower case 22 and is provided for running a cable connecting the battery stacks 11 to 15 to a load.

A current breaker 71 is fixed to one of the two battery monitor units 40. The current breaker 71 is used to break a current path in each of the battery stacks 11 to 15. The current breaker 71 is formed of a plug and a grip to be inserted into the plug, and can break the current path when the grip is removed from the plug.

Next, the circuit configuration of the battery pack 1 is described with reference to FIG. 14.

In the present embodiment, the five battery stacks 11 to 15 are used to constitute two assembled batteries 91 and 92, and the two assembled batteries 91 and 92 are connected electrically in parallel. The assembled batteries 91 and 92 include an equal number of cells. The assembled batteries 91 and 92 are connected to a load. Examples of the load include the motor generator, the step-up circuit, and the inverter.

One of the two battery monitor units 40 shown in FIG. 13 is used to monitor the state of the assembled battery 91, and the other of the battery monitor units 40 is used to monitor the state of the assembled battery 92. The states of the assembled batteries 91 and 92 include the current, voltage, and temperature. The voltage includes a voltage of each of the assembled batteries 91 and 92, a voltage of the cell, and a voltage of each of a plurality of blocks when the plurality of cells constituting the assembled batteries 91 and 92 are divided into the blocks. Each of the blocks includes two or more cells. The temperature includes a temperature measured at one point or a plurality of points of each of the assembled batteries 91 and 92.

The current, voltage, and temperature monitored by the battery monitor unit 40 are used to control charge and discharge of each of the battery stacks 11 to 15. For example, the current or the like is used to estimate the SOCs of the battery stacks 11 to 15 or to estimate the deterioration states of the battery stacks 11 to 15. The voltage or the like is used to suppress overcharge or overdischarge in the battery stacks 11 to 15.

The assembled battery 91 is formed of the two battery stacks 11 and 15 and part of the battery stack 13. The cells in the battery stacks 11, 15, and 13 are connected electrically in series. The assembled battery 92 is formed of the two battery stacks 12 and 14 and part of the battery stack 13. The cells in the battery stacks 12, 14, and 13 are connected electrically in series.

A fuse 72 is provided for each of the battery stacks 11 to 15. One current breaker 71 is provided between the battery stack 11 and the battery stack 15, and the other current breaker 71 is provided between the battery stack 12 and the battery stack 14. The two current breakers 71 are integrally formed, and the current paths in the assembled batteries 91 and 92 can be simultaneously broken by removing the grip of the current breaker 71.

A system main relay SMR_B1 is connected to a positive terminal of the assembled battery 91, and a system main relay SMR_B2 is connected to a positive terminal of the assembled battery 92. A system main relay SMR_G is connected to negative terminals of the assembled batteries 91 and 92. A system main relay SMR_P and a resistor 73 are connected in parallel to the system main relay SMR_G. The system main relays SMR_B1, SMR_B2, SMR_G, and SMR_P are included in the abovementioned electronic device 60.

To connect the assembled batteries 91 and 92 to the load electrically, the system main relays SMR_B1 and SMR_B2, and the system main relay SMR_P are first switched from OFF to ON. Next, the system main relay SMR_G is switched from OFF to ON, and then the system main relay SMR_P is switched from ON to OFF. This allows charge and discharge of the assembled batteries 91 and 92. The assembled batteries 91 and 92 may be connected to a DC power source or an AC power source to charge the assembled batteries 91 and 92.

Next, the flow of the air supplied to the battery pack 1 is described with reference to FIGS. 15 to 17.

Figure 15:
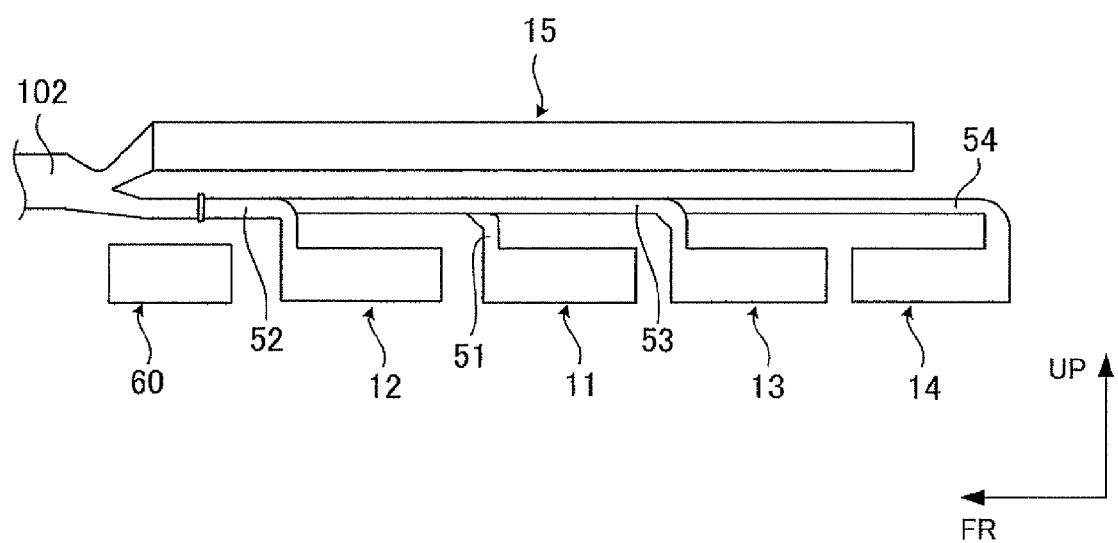
FIG. 15 is a side view showing the internal structure of the battery pack.

As shown in FIG. 15, the air from the air inlet duct 102 is directed to the battery stack 15 and is directed to the battery stacks 11 to 14 through the branch ducts 51 to 54. After the air reaches the battery stack 15, the air moves along the air inlet chamber 154 and enters into the space fainted between adjacent two of the cells 151 as shown by arrows in FIG. 16. Heat exchange performed between the air and the cells 151 adjusts the temperature of the cells 151.

The air directed to the battery stack 15 moves from the air inlet chamber 154 toward the air outlet chamber 155. The air after the heat exchange moves to the air outlet chamber 155 and is discharged through the air outlet port 155a of the air outlet chamber 155. The air discharged through the air outlet port 155a moves to the space surrounded by the upper case 21 and the lower case 22 (the space accommodating the battery stacks 11 to 15).

The air passing through the branch duct 51 is directed to the battery stack 11. The air directed to the battery stack 11 moves along the air inlet chamber 114. Then, the air moves toward both ends of the battery stack 11. The air moves along the direction of the alignment of the battery stack 11 and enters into the space formed between adjacent two of the cells 111. Heat exchange performed between the air and the cells 111 adjusts the temperature of the cells 111. The air after the heat exchange moves to the air outlet chamber 115 and is discharged through the air outlet ports 115a provided at both ends of the battery stack 11. The air discharged through the air outlet ports 115a moves into the space formed between the upper case 21 and the lower case 22.

The air directed from the branch duct 52 to the battery stack 12 moves toward both ends of the battery stack 12 within the air inlet chamber and moves into the space formed between adjacent two of the cells. The air after heat exchange with the cells moves to the air outlet chamber and is discharged through the air outlet ports provided at both ends of the battery stack 12. The air discharged through the air outlet port of the battery stack 12 moves to the space surrounded by the upper case 21 and the lower case 22.

The air directed from the branch duct 53 to the battery stack 13 moves toward both ends of the battery stack 13 within the air inlet chamber and moves to the space formed between adjacent two of the cells. The air after heat exchange with the cells moves to the air outlet chamber and is discharged through the air outlet ports provided at both ends of the battery stack 13. The air discharged through the air outlet port of the battery stack 13 moves to the space surrounded by the upper case 21 and the lower case 22.

The air directed from the branch duct 54 to the battery stack 14 moves toward both ends of the battery stack 14 within the air inlet chamber and moves to the space formed between adjacent two of the cells. The air after heat exchange with the cells moves to the air outlet chamber and is discharged through the air outlet ports provided at both ends of the battery stack 14. The air discharged through the air outlet port of the battery stack 14 moves to the space surrounded by the upper case 21 and the lower case 22.

The air outlet chamber of the battery stack 13 is opposed to the air outlet chamber of the battery stack 14 in the forward-rearward direction of the vehicle 100. The battery stacks 13 and 14 are close to each other in the forward-rearward direction of the vehicle 100. Specifically, the interval between the battery stacks 13 and 14 is smaller than the interval between the battery stacks 11 and 12 and the interval between the battery stacks 11 and 13. The placement of the battery stacks 13 and 14 close to each other may cause the heat discharged from the battery stack 13 to reach the cells of the battery stack 14, by way of example.

Since the air outlet chambers of the battery stacks 13 and 14 are opposed to each other in the present embodiment, the heat from the air outlet chamber of the battery stack 13, for example, merely reaches the air outlet chamber of the battery stack 14. Even when the heat from the battery stack 13 reaches the air outlet chamber of the battery stack 14, the heat is merely discharged from the air outlet chamber of the battery stack 14. Thus, the heat from the battery stack 13 can be prevented from reaching the cells of the battery stack 14.

The air present within the pack case 20 (the air after heat exchange) is directed to the air outlet duct 106 and then moves to the outside of the pack case 20. The air enters into the air outlet duct 106, moves along the air outlet duct 106, and is discharged to the outside of the vehicle 100 through the air outlet port 106b (see FIG. 1).

Figure 16:
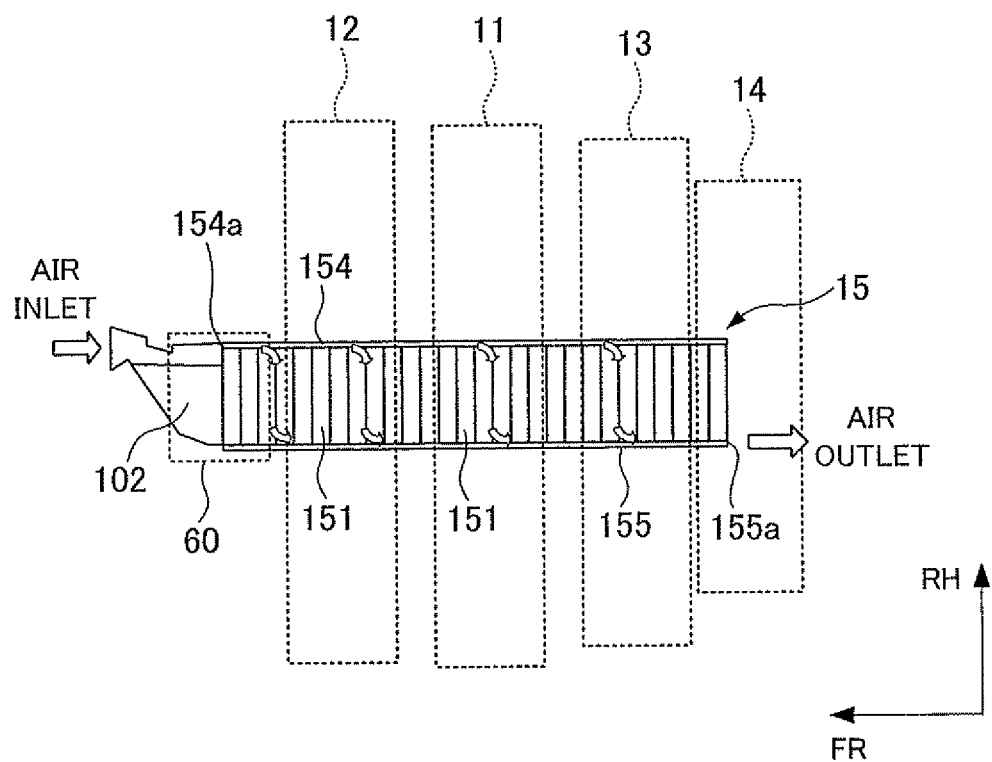
FIG. 16 is a diagram for explaining the moving path of air in the battery stack.
Figure 17:
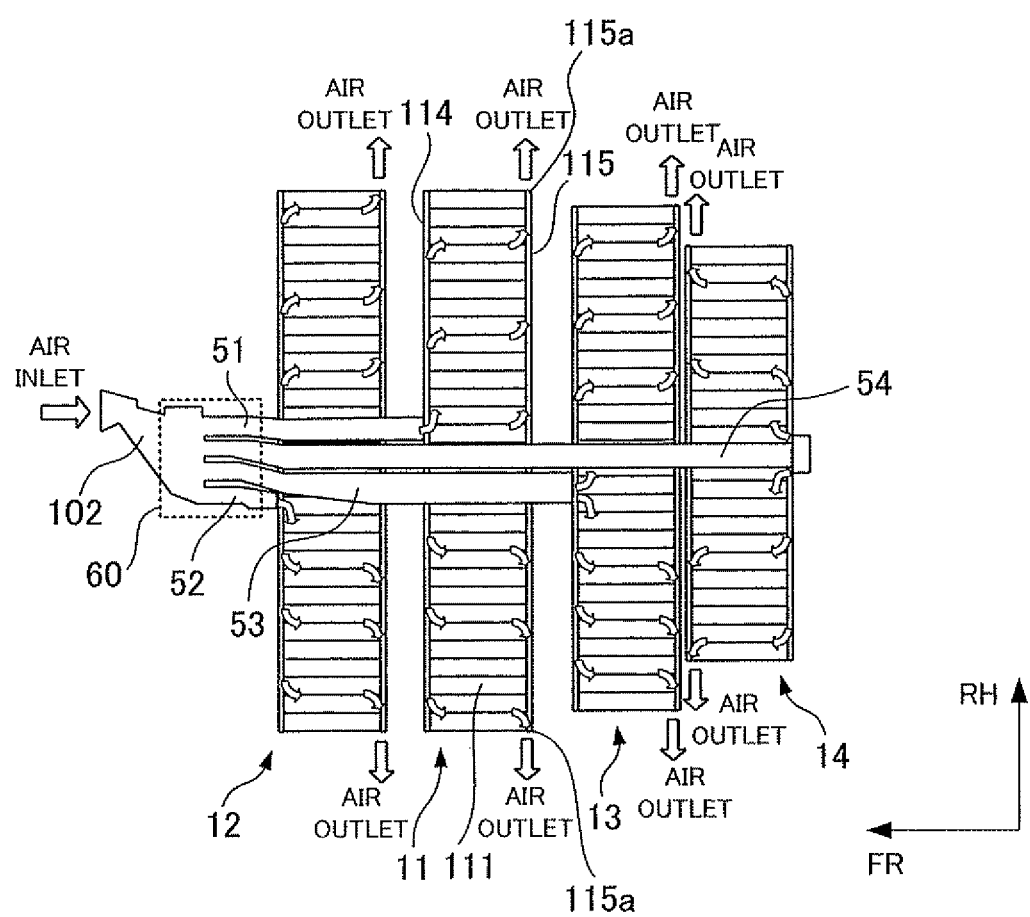
FIG. 17 is a diagram for explaining the moving path of air in the battery stack.

As shown in FIG. 15 to FIG. 17, the electronic device 60 is placed below the battery stack 15, so that heat produced in the electronic device 60 moves upward and easily reaches the battery stack 15. In the present embodiment, the connecting portion of the battery stack 15 and the air inlet duct 102 is located above the electronic device 60. Thus, the air from the air inlet duct 102 first reaches the portion of the battery stack 15 which the heat of the electronic device 60 easily reaches. This can prevent the heat of the electronic device 60 from heating only a portion of the battery stack 15, thereby making it possible to avoid variations in temperature among the plurality of cells 151 in the direction of the alignment of the cells 151.

The placement of the battery stack 15 inside the center tunnel 101a as in the present embodiment can increase the number of the battery stacks 11 to 15 constituting the battery pack 1. Since the center tunnel 101a is located between the driver's seat and the passenger's seat, the provision of the center tunnel 101a has no adverse effect on the comfort of the vehicle interior.

The placement of the battery stack 15 within the center tunnel 101a and the placement of the electronic device 60 and the battery stacks 11 to 14 in the same plane can place the battery pack 1 along the floor panel 101. In other words, the battery pack 1 can be efficiently placed along the outer face of the vehicle 100 to prevent an increase in size of the battery pack 1 in the vertical direction of the vehicle 100.

While the single battery stack 15 is placed in the center tunnel 101a of the floor panel 101 in the present embodiment, the present invention is not limited thereto. For example, a plurality of battery stacks can be placed in the center tunnel 101a. The plurality of battery stacks placed within the center tunnel 101a may be placed side by side in the forward-rearward direction of the vehicle 100 or may be placed side by side in the left-right direction of the vehicle 100. The entirety of the battery stack 15 does not need to be located inside the center tunnel 101a, but only part of the battery stack 15 may be located inside the center tunnel 101a.

Figure 14:
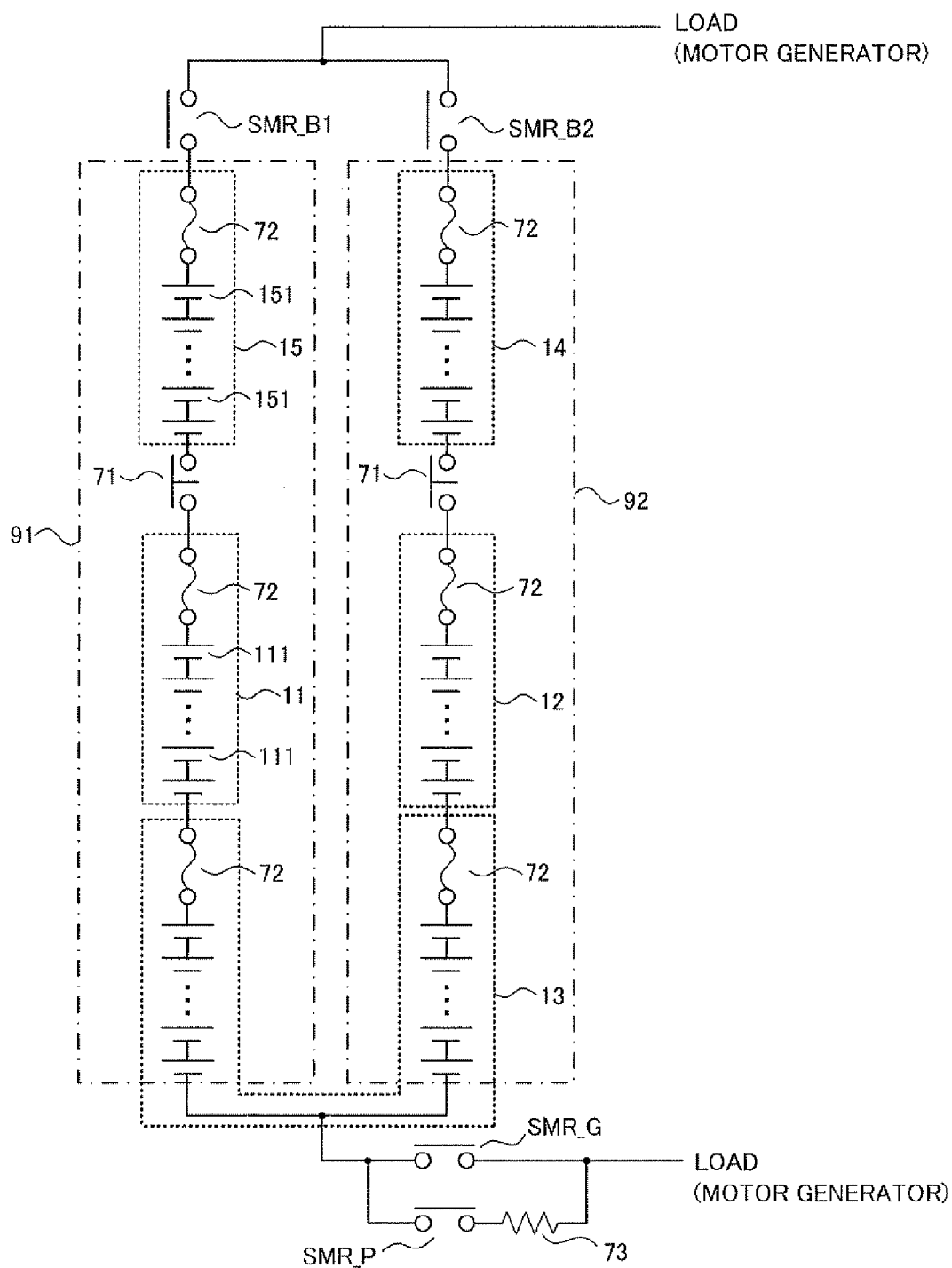
FIG. 14 is a diagram showing the circuit configuration of the battery pack.

While the two assembled batteries 91 and 92 are connected electrically in parallel in the present embodiment as described in FIG. 14, the present invention is not limited thereto. For example, the assembled batteries 91 and 92 may be connected in series. The battery stacks 11 to 15 may be used to constitute three or more assembled batteries, and such assembled batteries may be connected electrically in parallel. While the air present outside the vehicle 100 is supplied to the battery pack 1 in the present embodiment, the air in the vehicle interior may be supplied to the battery pack 1.

While the battery stacks 11 to 14 and the electronic device 60 are placed below the battery stack 15, the present invention is not limited thereto. For example, only the electronic device 60 may be placed below the battery stack 15. The battery stack 15 is formed of the plurality of cells 151 and the like and is larger than the electronic device 60. The placement of the battery stack 15 along the floor panel 101 and the placement of the electronic device 60 below the battery stack 15 can achieve the efficient placement of the battery stack 15 and the electronic device 60 with respect to the floor panel 101. If the electronic device 60 is placed above the battery stack 15, dead space is easily formed between the battery stack 15 and the electronic device 60. When the electronic device 60 is placed below the battery stack 15 as in the present embodiment, the formation of such dead space can be suppressed.

While the four battery stacks 11 to 14 are placed below the battery stack 15 in the present embodiment, the present invention is not limited thereto. Specifically, one or more battery stacks can be placed below the battery stack 15.

The invention claimed is:

1. A vehicle comprising:
a floor panel; and
an electric storage apparatus fixed to a lower face of the floor panel, the electric storage apparatus outputting energy for use in running of the vehicle,
wherein the electric storage apparatus includes:
a first electric storage stack extending lengthwise in a first direction and including a plurality of electric storage elements that are placed side by side to form a row that extends in the first direction;
a plurality of second electric storage stacks placed side by side to form a row that extends in the first direction, a portion of each of the plurality of second electric storage stacks being located below the first electric storage stack, each of the plurality of second electric storage stacks extending lengthwise in a second direction orthogonal to the first direction, and including a plurality of electric storage elements that are placed side by side to form a row that extends in the second direction;
a plurality of ducts connected to the plurality of second electric storage stacks, the plurality of ducts supplying a cooling medium to the plurality of second electric storage stacks, respectively, and being located along the first electric storage stack in spaces between the first electric storage stack and the plurality of second electric storage stacks;
an electronic device used to control charge and discharge of the electric storage apparatus, the electronic device being located below the first electric storage stack in the vehicle; and
a case accommodating the first electric storage stack, the plurality of second electric storage stacks, the plurality of ducts and the electronic device, the case being fixed to and contacting the lower face of the floor panel.

2. The vehicle according to claim 1, further comprising a duct connected to the first electric storage stack and supplying the cooling medium to the first electric storage stack,
wherein the electronic device is located below a portion connecting the first electric storage stack to the duct in the vehicle.

3. The vehicle according to claim 1, wherein the floor panel has a tunnel recessed upward in the vehicle, and
at least part of the first electric storage stack is located inside the tunnel.

4. The vehicle according to claim 3, wherein the tunnel extends in a forward-rearward direction of the vehicle, and
the first direction is the forward-rearward direction.

5. The vehicle according to claim 3, wherein the tunnel is located between a driver's seat and a passenger's seat.

6. The vehicle according to claim 1, wherein
one of the plurality of second electric storage stacks is placed next to the electronic device in the first direction.

7. The vehicle according to claim 1, wherein the second direction is a left-right direction of the vehicle.

8. The vehicle according to claim 1, wherein the first direction is a forward-rearward direction of the vehicle.

9. The vehicle according to claim 1, wherein the electronic device is a relay switching conduction and non-conduction between the electric storage apparatus and a load.

10. The vehicle according to claim 1, wherein the case has an upper face disposed between the first electric storage stack and the floor panel.

11. An electric storage apparatus that is configured to be mounted on a vehicle and that outputs energy for use in running of the vehicle, comprising:

a first electric storage stack extending lengthwise in a first direction and including a plurality of electric storage elements that are placed side by side to form a row that extends in the first direction;

a plurality of second electric storage stacks placed side by side to form a row that extends in the first direction, a portion of each of the plurality of second electric storage stacks being placed below the first electric storage stack, each of the plurality of second electric storage stacks extending lengthwise in a second direction orthogonal to the first direction, and including a plurality of electric storage elements that are placed side by side to form a row that extends in the second direction;

a plurality of ducts connected to the plurality of second electric storage stacks, the plurality of ducts supplying a cooling medium to the plurality of second electric storage stacks, respectively, and being located along the first electric storage stack in spaces between the first electric storage stack and the plurality of second electric storage stacks;

an electronic device used to control charge and discharge of the electric storage apparatus, the electronic device being located below the first electric storage stack in the vehicle; and a case accommodating the first electric storage stack, the plurality of second electric storage stacks, the plurality of ducts and the electronic device, the case being fixed to and contacting a lower face of a floor panel of the vehicle.

12. The electric storage apparatus according to claim 11, wherein the floor panel has a tunnel recessed upward in the vehicle, and
at least part of the first electric storage stack is located inside the tunnel.

13. The electric storage apparatus according to claim 11, wherein one of the plurality of second electric storage stacks is placed next to the electronic device in the first direction.

14. The electric storage apparatus according to claim 11, wherein the case has an upper face disposed between the first electric storage stack and the floor panel.

* * * * *